June 20, 1939.     A. A. ABBOTT     2,163,366
PRESSURE GREASE DISPENSER
Filed June 10, 1938
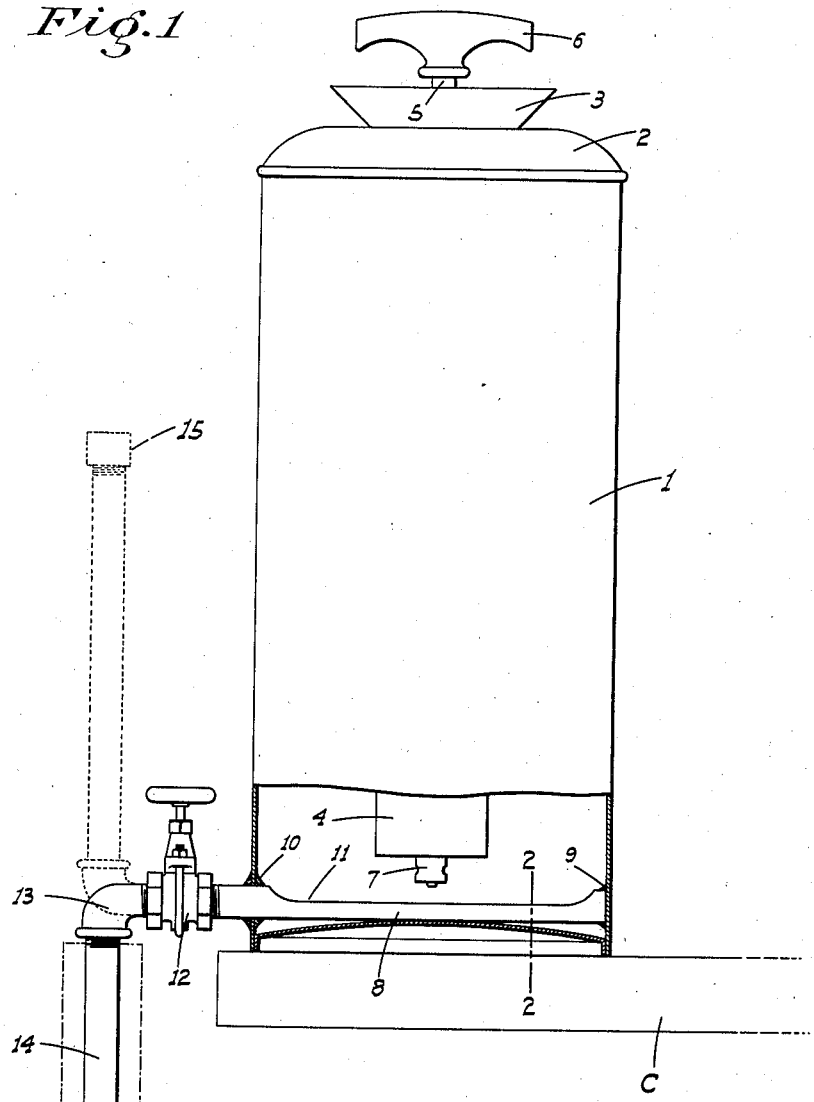
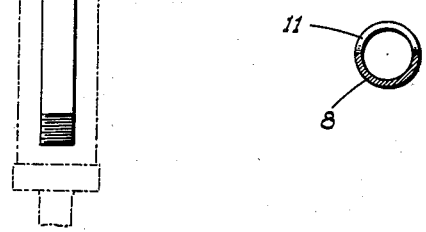
INVENTOR
A.A. Abbott
BY
ATTORNEY Patented June 20, 1939

2,163,366

UNITED STATES PATENT OFFICE 2,163,366

PRESSURE GREASE DISPENSER

Alva A. Abbott, Turlock, Calif.

Application June 10, 1938, Serial No. 212,997

3 Claims. (Cl. 221—77)

This invention relates generally to a pressure grease dispenser, and in particularly the invention is directed to a dispenser of such type arranged to fill grease guns such as are used in connection with the lubrication of motor vehicles.

The principal object of the invention is to provide a dispenser wherein the grease is maintained under pressure and at the same time free from dust and dirt; the dispenser being arranged so that grease may be conveniently dispensed into a grease gun and without forming air pockets. The device is well suited for use in garages, service stations, or in the field where agricultural implements require frequent lubrication with resultant necessity of refilling the grease guns used for such purpose.

Another object of the invention is to provide novel means for dispensing the grease from the container to the valve; said means being arranged so as to provide a rigid support for said valve.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawing similar characters of reference indicate corresponding parts in the several views:

Figure 1 is a side elevation of the device; the tank being partly in section.

Figure 2 is a cross section of the grease receiving trough taken on line 2—2 of Fig. 1.

Referring now more particularly to the characters of reference on the drawing, the numeral 1 indicates a portable vertically disposed tank having a substantial capacity preferably 3 to 5 gallons. The top 2 of the tank is provided with a filler opening surrounded by a funnel 3. A hand actuated pump unit including a cylinder 4, a piston rod 5, an operating handle 6 on the upper end of the handle, and a check valve 7 on the lower end of the cylinder, is removably mounted in closing relation through the filler opening and depends therefrom into the tank. This pump unit is of standard construction and is removably secured in place in the manner commonly done in connection with liquid spray tanks wherein the liquid is held under pressure.

A length of pipe 8 extends horizontally across the tank at the bottom and one end projects through an opening in the tank wall to a termination a short distance outwardly thereof. This length of pipe is secured, preferably by welding, to the tank walls both at the inner end of the pipe, as at 9, and at the point in its length where it extends through the wall as shown at 10. The portion of the pipe in the tank between the opposed walls thereof is cut away on top as at 11 so that said pipe within the tank forms an upwardly opening substantially semicircular grease receiving trough.

A gate valve 12 is threaded on the outer end of pipe 8 and such valve supports a street elbow 13 which is threaded thereinto. Another length of pipe 14 is threaded into elbow 13; the outer end of such pipe being provided with a removable cap 15 threaded thereon. Pipe 14 is of substantially the same length as the barrel B of a grease gun adapted to be filled from the dispenser. The pipe 14 and elbow 13 form a swinging spout unit which when not in use may be turned upwardly from the valve as shown in dotted lines in Fig. 1.

In use, a quantity of grease of fluid or semifluid consistency is placed in the tank, the funnel 3 facilitating such operation. Thereafter, the pump unit is secured in place and pressure introduced into the tank.

To fill the barrel B of a grease gun, the tank is placed on a bench C or the like adjacent one edge thereof and pipe 14 is swung to a depending position alongside the bench, as shown in full lines in Fig. 1. The cap 15 is removed and the pipe 14 is then inserted into the barrel B from its open end and for its full length. Valve 12 is opened and grease received in the trough formed by cut away pipe 8 flows therefrom through the valve into pipe 14 and out into the grease gun barrel. As the barrel fills, the same is lowered and thus pipe 14 is gradually withdrawn filling the barrel with grease and without air pockets therein.

By reason of the rigid and fixed mounting of the pipe 8 in the tank at opposed points 9 and 10, there is no tendency for ruptures and leakage to occur where said pipe extends through the tank and the tank can be made of lighter metal than would otherwise be required.

As the valve 12 clears the bottom of the tank, the device may be set upright on the ground, etc.—when the pipe 14 is turned up—without danger of damage being done to the dispensing apparatus.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A pressure grease dispenser comprising an enclosed tank, means to introduce air under pressure into the tank, a pipe extending between opposed walls of the tank adjacent the bottom thereof and initially open at one end through the adjacent tank wall, the pipe being cut away on top between said walls to form a trough, a valve disposed exteriorly of the tank and mounted in connection with said open end of the pipe, and a spout mounted on the valve.

2. A device as in claim 1, in which said pipe is fixedly secured in connection with said opposed walls.

3. A pressure grease dispenser comprising an enclosed tank, means to introduce air pressure into the tank, a pipe extending between opposed walls of the tank adjacent the bottom thereof, the pipe being cut away on top between said walls to form a trough, and one end of said pipe projecting through the tank wall and terminating therebeyond, a valve on the outer end of said pipe, and a spout mounted on the valve.

ALVA A. ABBOTT.